United States Patent
Gretz

(10) Patent No.: US 11,271,379 B1
(45) Date of Patent: Mar. 8, 2022

(54) SNAP FIT ELECTRICAL FITTING FOR NINETY DEGREE CONNECTION OF ELECTRICAL CABLES TO AN ELECTRICAL BOX

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

(*) Notice: Subject to any disclaimer, the term of this patent is extended or adjusted under 35 U.S.C. 154(b) by 87 days.

(21) Appl. No.: 15/017,983

(22) Filed: Feb. 8, 2016

Related U.S. Application Data

(63) Continuation-in-part of application No. 14/675,904, filed on Apr. 1, 2015, now Pat. No. 10,483,735.

(60) Provisional application No. 62/113,411, filed on Feb. 7, 2015.

(51) Int. Cl.
| | |
|---|---|
| *H02G 3/06* | (2006.01) |
| *H02G 3/22* | (2006.01) |
| *H02G 3/08* | (2006.01) |
| *H02G 3/32* | (2006.01) |

(52) U.S. Cl.
CPC ........... *H02G 3/0616* (2013.01); *H02G 3/083* (2013.01); *H02G 3/22* (2013.01); *H02G 3/32* (2013.01); *H02G 3/0683* (2013.01); *H02G 3/0691* (2013.01)

(58) Field of Classification Search
CPC ........ H02G 3/022; H02G 3/083; H02G 3/088; H02G 3/0675; H02G 3/0691; H02G 3/0633; H02G 3/0616; H02G 3/065; H01R 13/58; H01R 13/5812; H01R 13/5833
See application file for complete search history.

(56) References Cited

U.S. PATENT DOCUMENTS

| | | | | |
|---|---|---|---|---|
| 4,103,101 A * | 7/1978 | Maier | ...................... | H05K 5/04 174/660 |
| 6,248,952 B1 * | 6/2001 | Reeves | ..................... | H02G 3/06 16/2.1 |
| 6,709,280 B1 * | 3/2004 | Gretz | ....................... | H02G 3/06 174/652 |
| 6,932,390 B1 * | 8/2005 | Gretz | .................. | F16L 27/0837 285/181 |
| 7,161,095 B1 * | 1/2007 | Gretz | .................. | H02G 3/0666 16/2.1 |

(Continued)

*Primary Examiner* — Paresh H Paghadal

(57) ABSTRACT

A ninety degree electrical fitting for connecting electrical cable to an electrical box. The ninety degree electrical fitting includes a connector body with a leading end and a trailing end, a snap ring connected to the leading end, and a clip member connected to the trailing end. A leading flange and a box engagement flange on the leading end of the connector body define a means for retaining the snap ring on the connector body. A clip member connected to the connector body provides a means for securing an electrical cable to the trailing end of the fitting. Internal walls on the connector body define an internal passageway having a wide turn radius, to enable wiring leads from an electrical cable to pass easily through the internal passageway of the connector body. The ninety degree snap fit electrical fitting provides good electrical continuity between the outer sheath of an electrical cable, the electrical box, and the fitting.

2 Claims, 8 Drawing Sheets

(56) References Cited

U.S. PATENT DOCUMENTS

| | | | | |
|---|---|---|---|---|
| 7,214,890 B2* | 5/2007 | Kiely | .................. | H02G 3/0691 |
| | | | | 174/659 |
| 7,226,309 B1* | 6/2007 | Gretz | ................ | H01R 13/5808 |
| | | | | 174/660 |
| 7,495,184 B1* | 2/2009 | Gretz | ................ | H01R 13/5812 |
| | | | | 16/2.1 |
| 8,124,891 B1* | 2/2012 | Gretz | .................. | H02G 3/0691 |
| | | | | 164/137 |
| 2006/0127025 A1* | 6/2006 | Haberman | ........... | G02B 6/4478 |
| | | | | 385/134 |
| 2013/0219683 A1* | 8/2013 | Chen | ................... | H02G 3/0431 |
| | | | | 29/428 |
| 2014/0010261 A1* | 1/2014 | Niemann | ............... | G01K 1/143 |
| | | | | 374/120 |
| 2015/0236458 A1* | 8/2015 | Zimmerhaeckel | ... | H01R 24/545 |
| | | | | 439/582 |

* cited by examiner

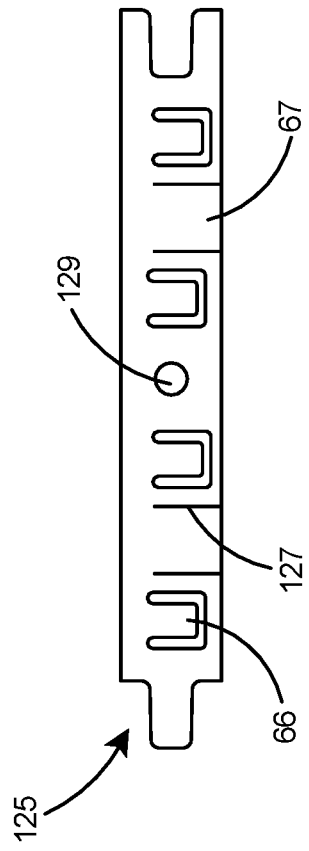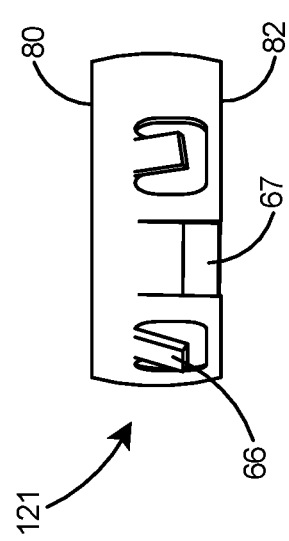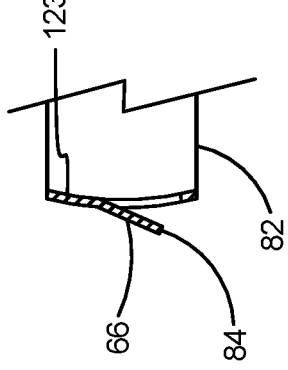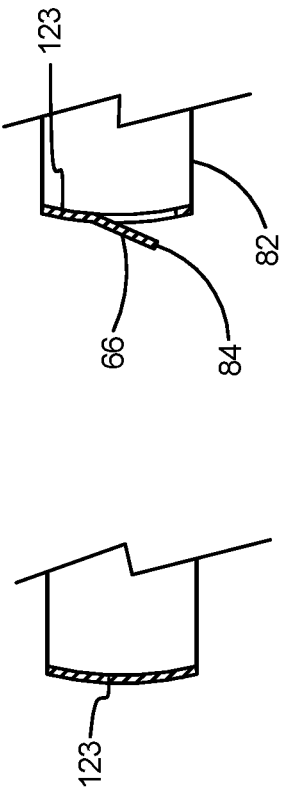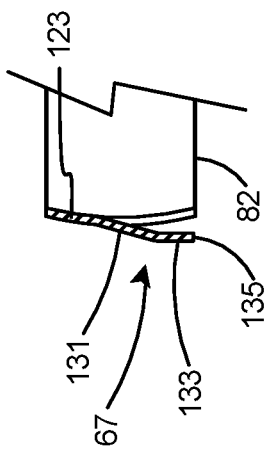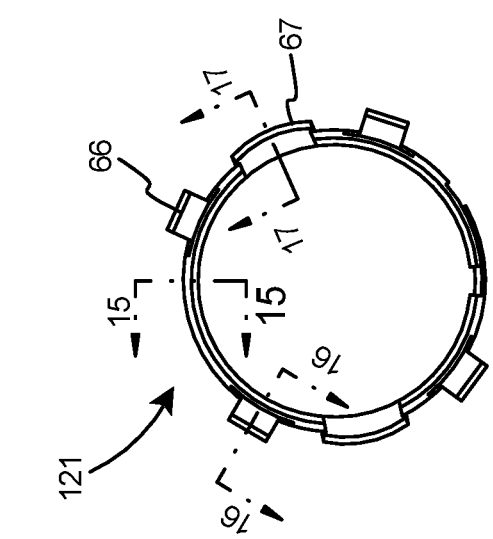

SNAP FIT ELECTRICAL FITTING FOR NINETY DEGREE CONNECTION OF ELECTRICAL CABLES TO AN ELECTRICAL BOX

CROSS-REFERENCE TO RELATED APPLICATIONS

This application claims priority to provisional U.S. Application No. 62/113,411, filed Feb. 7, 2015 and is a continuation in part of U.S. patent application Ser. No. 14/675,904 filed Apr. 1, 2015, the contents of which are incorporated herein by reference in their entirety.

FIELD OF THE INVENTION

The present invention generally relates to electrical fittings, and more particularly to a ninety degree snap fit electrical fitting for connecting an electrical cable to an electrical box.

BACKGROUND

Quick-connect fittings are commonly used to rapidly connect electrical cables with electrical boxes. The quick connect fittings usually include a straight-line bore within the body of the fitting which allows easy insertion of an electrical cable through the straight-line bore.

There are times however, when there is little available space around an electrical box for straight-line connection of an electrical cable thereto. In such a situation, an electrical fitting that enables a 90-degree bend of the electrical cable, while not kinking or bending the cable at too sharp an angle, is oftentimes required as there is less available space around the electrical box and the fitting allows an installer to more easily connect an electrical cable to the box.

Conventional ninety-degree electrical fittings typically feature a connector body that includes set screws or clamps on each end to facilitate connection to an electrical box or panel on the leading end and connection to an electrical cable on the trailing end. Use of the screws or clamps requires an installer to manually attach and tighten the fastening arrangement, which leads to lengthy installation time.

Accordingly, what is needed is an electrical fitting facilitates a ninety-degree bend in the cable and that is capable of being rapidly connected to an electrical box on one end and rapidly connected to an electrical cable on the opposing end. Such a quick-connect electrical fitting should allow easy insertion of electrical cables through the internal passageway of the connector while still enabling a ninety degree bend in the cable. Most preferably, to provide proper electrical continuity between the fitting, the electrical box, and the electrical cable, the ninety-degree quick-connect electrical fitting should include a one-piece connector body.

BRIEF SUMMARY OF THE INVENTION

The present invention is a ninety degree electrical fitting for connecting electrical cable to an electrical box. The ninety degree electrical fitting includes a connector body with a leading end and a trailing end, a snap ring connected to the leading end, and a clip member connected to the trailing end. A leading flange and a box engagement flange on the leading end of the connector body define a means for retaining the snap ring on the connector body. A clip member connected to the connector body provides a means for securing an electrical cable to the trailing end of the fitting. Internal walls on the connector body define an internal passageway having a wide or gradual turn radius, to enable wiring leads from an electrical cable to pass easily through the internal passageway of the connector body. The ninety degree snap fit electrical fitting provides good electrical continuity between the outer sheath of an electrical cable, the electrical box, and the fitting itself including the snap ring, the clip member, and the connector body.

OBJECTS AND ADVANTAGES

A first object of the invention is to provide an electrical fitting that facilitates a ninety-degree bend in the cable wiring.

A second object of the invention is to provide an electrical fitting that facilitates rapid connection of an electrical cable to an electrical box.

A further object of the invention is to provide a fitting that enables snap-in connection to an electrical box on one end and snap-in connection of an electrical cable on the opposing end.

Another object of the invention is to provide a quick-connect electrical fitting that allows easy insertion of electrical cables through the internal passageway of the connector while providing a ninety-degree bend in the cable to the wiring as it passes through the fitting.

A further object of the invention is to provide a fitting that provide proper electrical continuity between the fitting, the electrical box, and the electrical cable.

A further object of the invention is to provide a fitting with a one-piece connector body for enhanced electrical continuity.

A further object of the invention is to provide an electrical fitting that includes a ninety-degree passageway with a wide bend radius to gently bend wiring into an electrical box when connecting a cable to the box.

These and other objects and advantages of the present invention will be better understood by reading the following description along with reference to the drawings.

BRIEF DESCRIPTION OF THE SEVERAL VIEWS OF THE DRAWING(S)

Reference is made herein to the accompanying drawings, which are not necessarily drawn to scale, and wherein:

FIG. 12 is a side view of a snap ring with an arcuate sidewall according to the present invention.

FIG. 13 is an elevation view of a blank used to form the snap ring of FIG. 12.

FIG. 14 is a plan view of the snap ring with arcuate sidewall.

FIG. 15 is a sectional view of the snap ring with arcuate sidewall taken along line 15-15 of FIG. 14.

FIG. 16 is a sectional view of the snap ring with arcuate sidewall taken along line 16-16 of FIG. 14.

FIG. 17 is a sectional view of the snap ring with arcuate sidewall taken along line 17-17 of FIG. 14.

DETAILED DESCRIPTION

Figure 1:
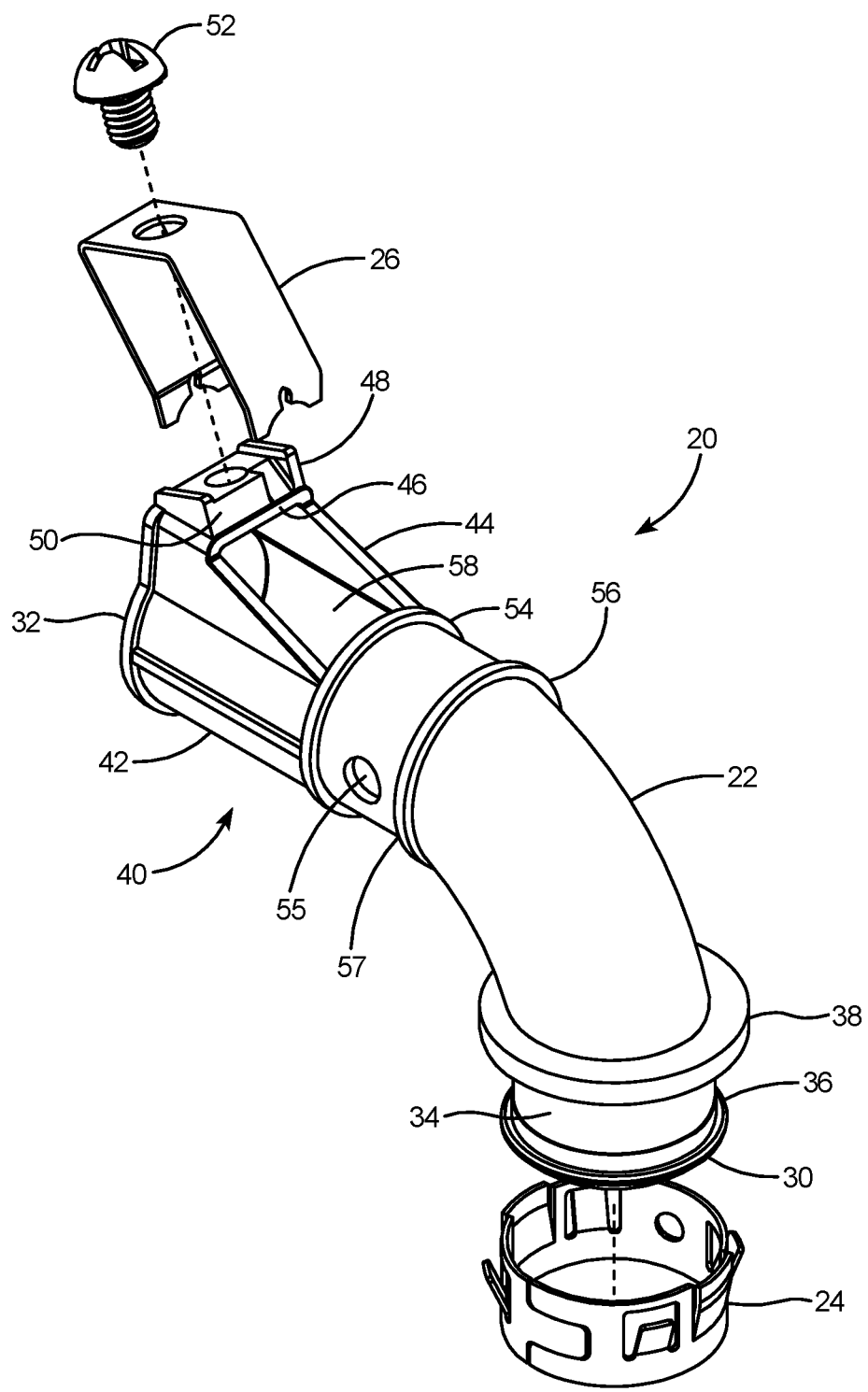
FIG. 1 is an exploded isometric view of a ninety degree snap fit electrical fitting in accordance with embodiments of the invention.

With reference to FIG. 1, the present invention comprises a ninety degree snap fit electrical fitting 20 for connecting an electrical cable to an electrical box. The ninety degree snap fit electrical fitting 20 includes a connector body 22, a snap ring 24, and a clip member 26. The connector body 22 includes a leading end 30 and a trailing end 32. Leading end as defined herein refers to the end of the connector body 22 that will connect to and lead into an electrical box (not shown). The trailing end 32 as defined herein refers to the end of the connector body 22 that will face away from the electrical box and to which an electrical cable (not shown) will be connected. A portion of the leading end 30 of the connector body 22 is necked-down to form a reduced-diameter seat 34. Reduced diameter seat 34 is bounded by a leading flange 36 and a box engagement flange 38.

The trailing end 32 of connector body 22 includes a cable attachment section 40 including a base portion 42, two outward extending arms 44, a bridge 46 extending between the arms 44. Two ears 48 extend outward from the bridge 46 and include a raised ramp 50 thereon. The clip member 26 is secured to the ramp 50 by fastener 52. The connector body 22 includes a trailing end flange 54 and a mid-body flange 56. The connector body 22 includes an opening 58 between the two arms 44 and the trailing end flange 54. An aperture 55 is provided in the wall of the connector body 22 at the leading end 57 of the cable attachment section 40.

Figure 2:
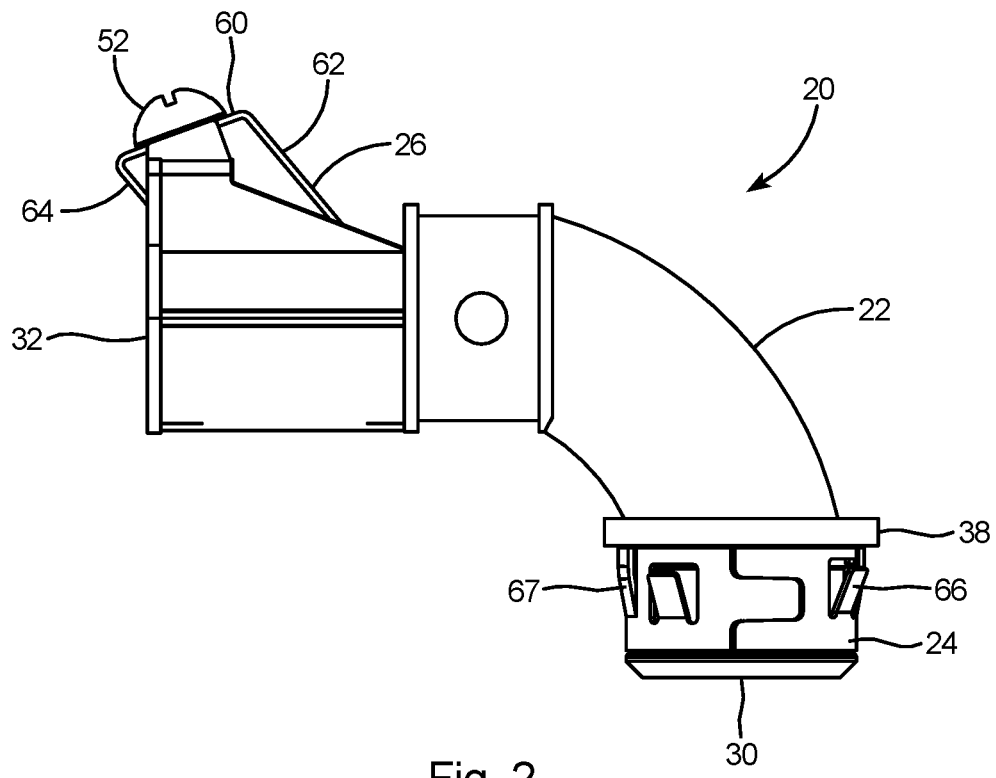
FIG. 2 is a side view of the ninety degree snap fit electrical fitting of FIG. 1.
Figure 3:
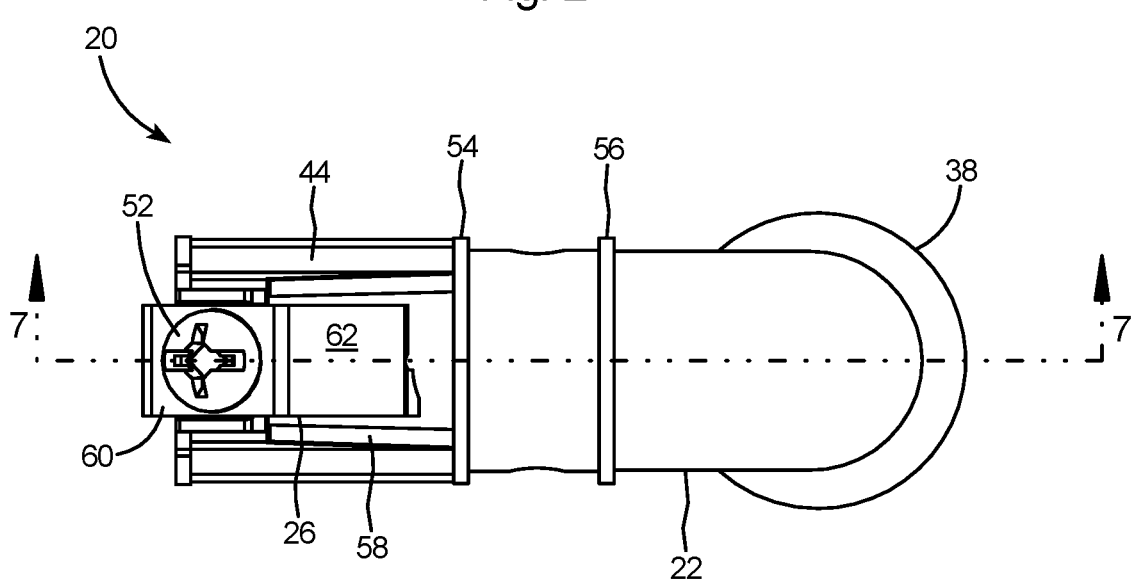
FIG. 3 is a top view of the ninety degree snap fit electrical fitting.

With reference to FIGS. 2 and 3, clip member 26 at trailing end 32 of connector body 22 preferably includes a base 60 having an aperture 61 therein and a leading leg 62 and trailing leg 64 extending from opposing ends of the base. Snap ring 24 at leading end 30 of connector body 20 includes one or more locking tangs 66 and one or more grounding tangs 67 extending outward from the ring.

Figure 9:
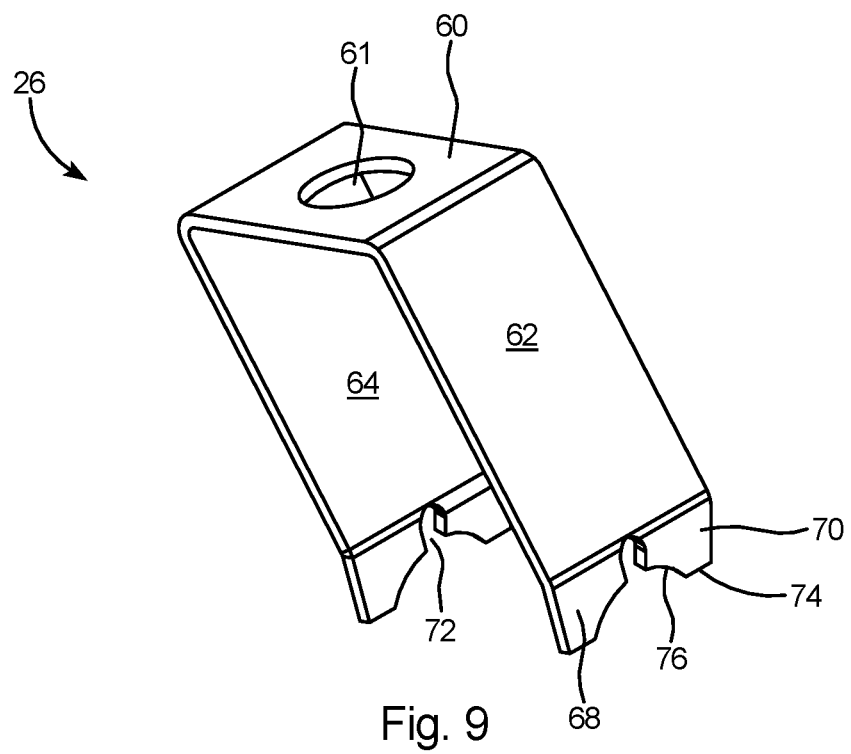
FIG. 9 is an isometric view of a clip member that forms a portion of the ninety degree snap fit electrical fitting of FIG. 1.

Referring to FIG. 9, the clip member 26 further includes two feet extending from the legs 62 and 64, including a forward extending foot 68 and a rearward extending foot 70. A notch 72 at the end of each leg 62 and 64 defines each foot. Each foot 68 and 70 includes a flat tip 74 and an arcuate surface 76 extending from the flat tip 74 to the notch 72.

Figure 10:
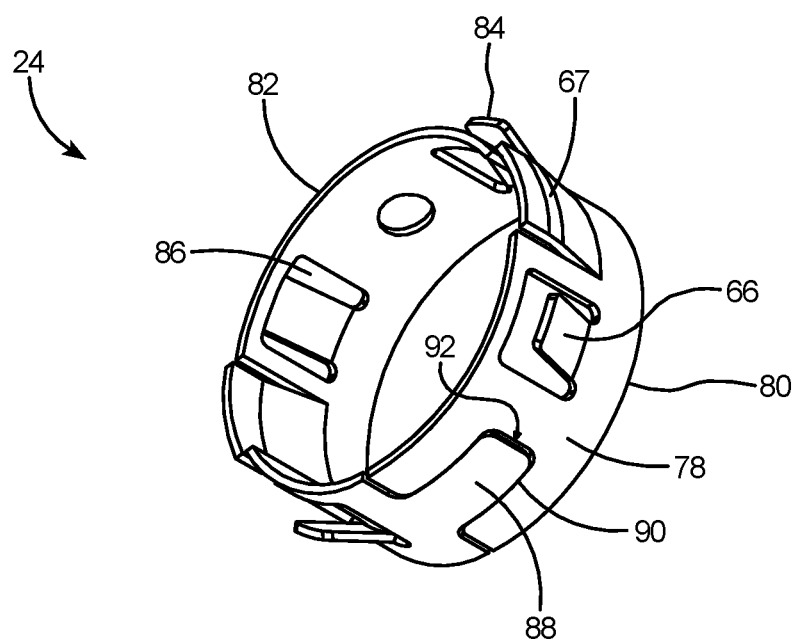
FIG. 10 is an isometric view of a snap ring that forms a portion of the ninety degree snap fit electrical fitting of FIG. 1.

As shown in FIG. 10, the snap ring 24 includes a ring body 78 having a leading end 80 and trailing end 82. The locking tangs 66 are lanced out of the ring body 78 and have free ends 84 extending toward the trailing end 82 of the ring 24. An opening 86 surrounds each locking tang 66. Snap ring 24 is preferably a split ring with a tab 88 at the split 90 extending into a notch 92 on the opposing end of the split ring. Locking tangs 66 and grounding tangs 67 are bent outwards of the ring body 78.

Figure 5:
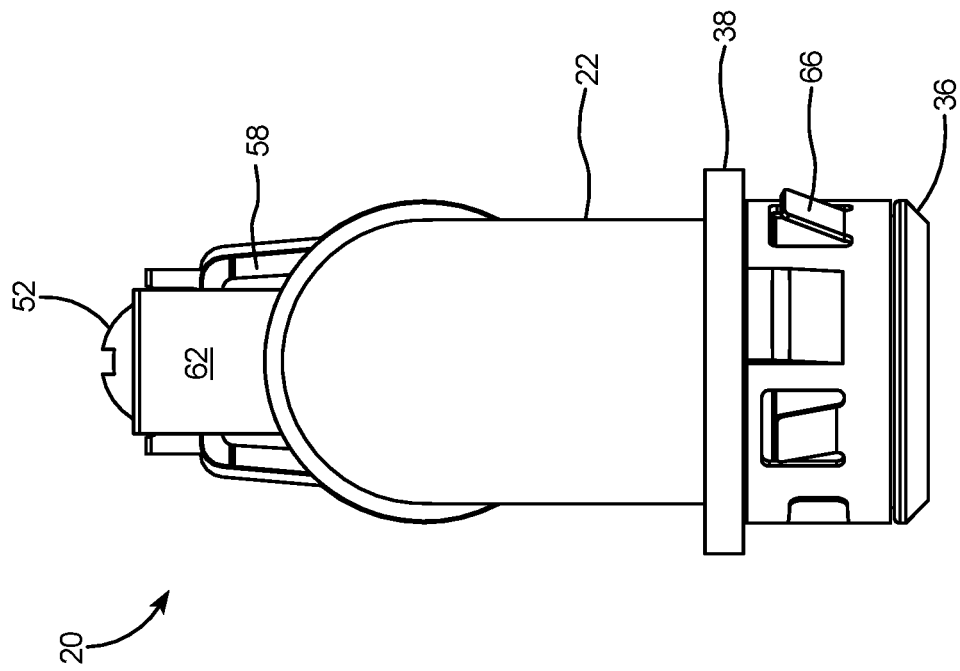
FIG. 5 is a side view of the ninety degree snap fit electrical fitting as viewed from the right side of FIG. 2.
Figure 4:
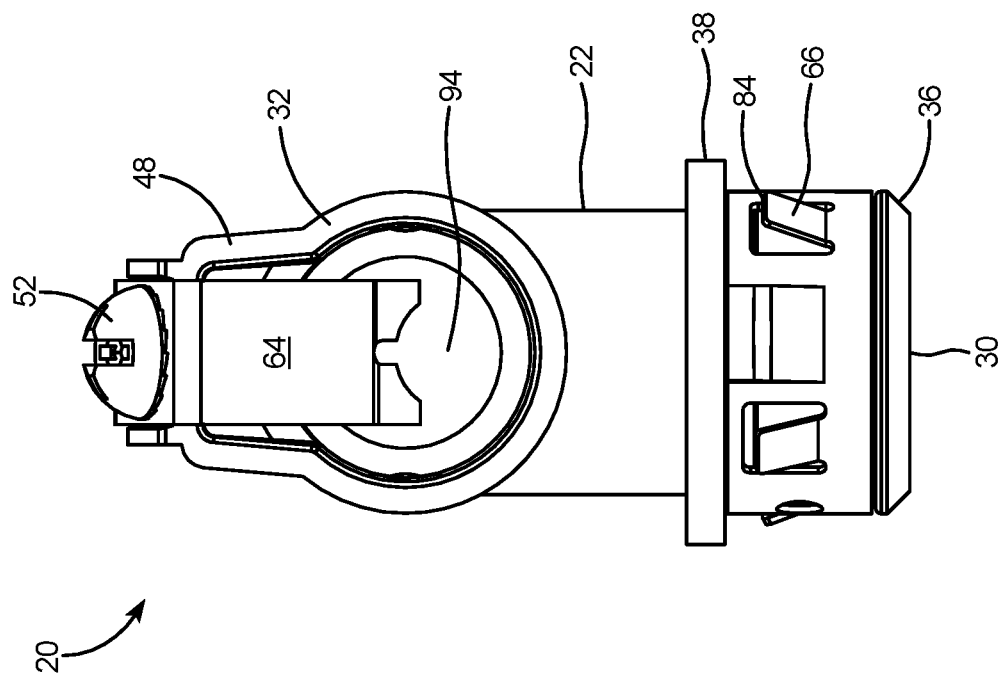
FIG. 4 is an end view of the ninety degree snap fit electrical fitting as viewed from the trailing end.

With reference to FIGS. 4 and 5, connector body 22 of ninety degree snap fit electrical fitting 20 includes a bore 94 there through. On the trailing end 32 of the fitting 20, the trailing leg 64 of the clip member extends into the bore 94. As shown in FIG. 5, the leading leg 62 extends through the connector body opening 58 into the bore. With snap ring 24 secured to connector body, free ends 84 of locking tangs 66 are directed toward box engagement flange 38 of connector body 22.

Figure 6:
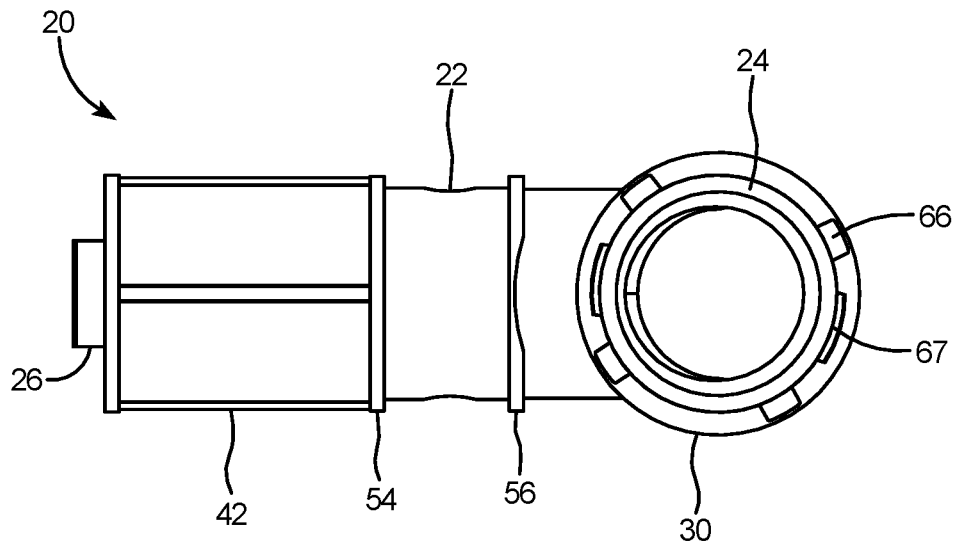
FIG. 6 is an end view of the ninety degree snap fit electrical fitting as viewed from the leading end.

As shown in FIG. 6, the preferred arrangement of locking tangs 66 and grounding tangs 67 extending outward from the snap ring 24 includes two grounding tangs 67 and four locking tangs 66. The locking tangs 66 enable an installer to simply press the leading end 30 into a knock out opening (not shown) in an electrical box, whereupon the locking tangs 66 will snap outward after passing the wall of the box and lock the leading end into the electrical box.

Figure 7:
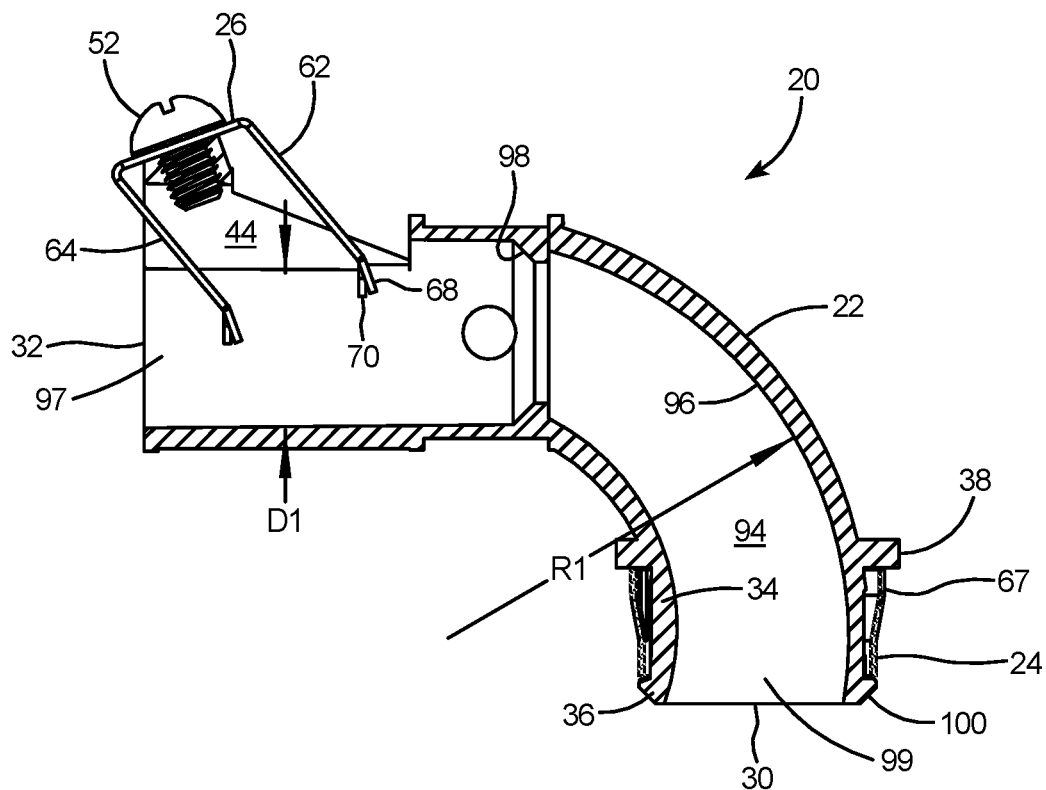
FIG. 7 is a sectional view of the ninety degree snap fit electrical fitting taken along line 7-7 of FIG. 3.

Referring to FIG. 7, the connector body 22 includes internal walls 96 defining an internal passageway or bore 94 having a wide turn radius R1, so that any electrical leads from an electrical cable (not shown) will pass easily through the bore 94 of the connector body 22. Connector body 22 includes a cable stop 98 therein, which is a narrowed section of the bore that will stop forward movement of any electrical cable (not shown) inserted into the bore 94 from the trailing end 32. Leading flange 36 includes an inwardly tapered surface 101 thereon. The connector body 22 includes a cable entry bore 97 at the trailing end 32 that is oriented at 90° to the exit bore 99 at the leading end 30. The meaning of wide turn radius R1 as used herein is that the ratio of the turn radius R1 with respect to the diameter D1 across entry bore 97 is preferably at least 2, or the turn radius is preferably at least twice the dimension across the entry bore. Bore 94 of connector body makes a full 90° turn from the leading end 30 to the trailing end 32.

Figure 8:
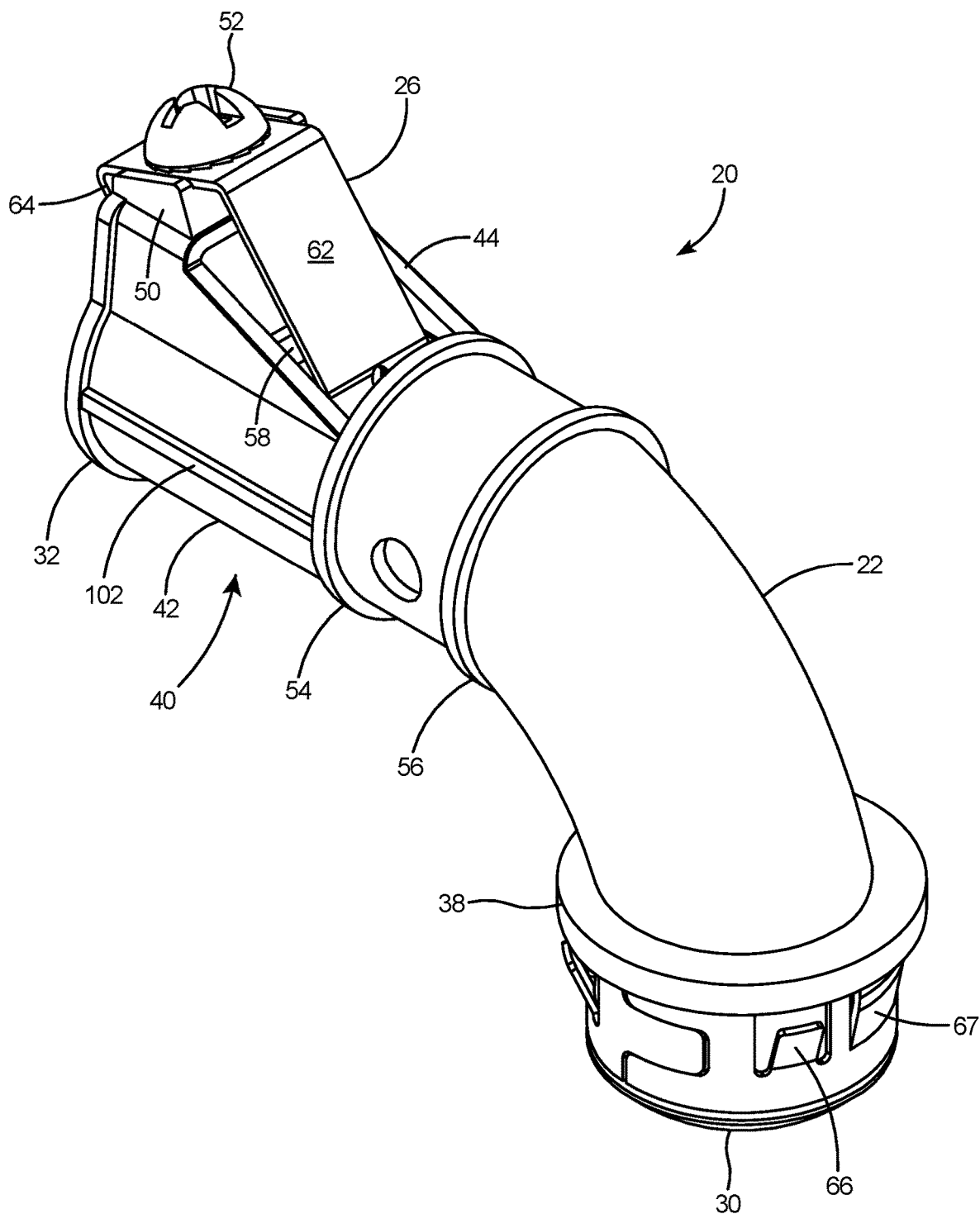
FIG. 8 is an isometric view of the ninety degree snap fit electrical fitting in accordance with embodiments of the invention, with the snap ring and the clip member assembled to the connector body.

With reference to FIG. 8, the assembled fitting 20 includes the snap ring 24 secured to the leading end 30 of the connector body 22 and the clip member 26 secured to the ramp 50 on the base portion 42 of the connector body. To insure resiliency and strength of the associated tangs 66 and 67 of the snap ring 24 and the legs of the clip member 26, snap ring 24 and clip member 26 are most preferably constructed of spring steel. Connector body 22 preferably is die-cast in one-piece of metal, most preferably die-cast of zinc alloy for enhanced electrical continuity. Connector body 22 further includes a longitudinal rib 102 extending along the cable attachment section 40.

Figure 11:
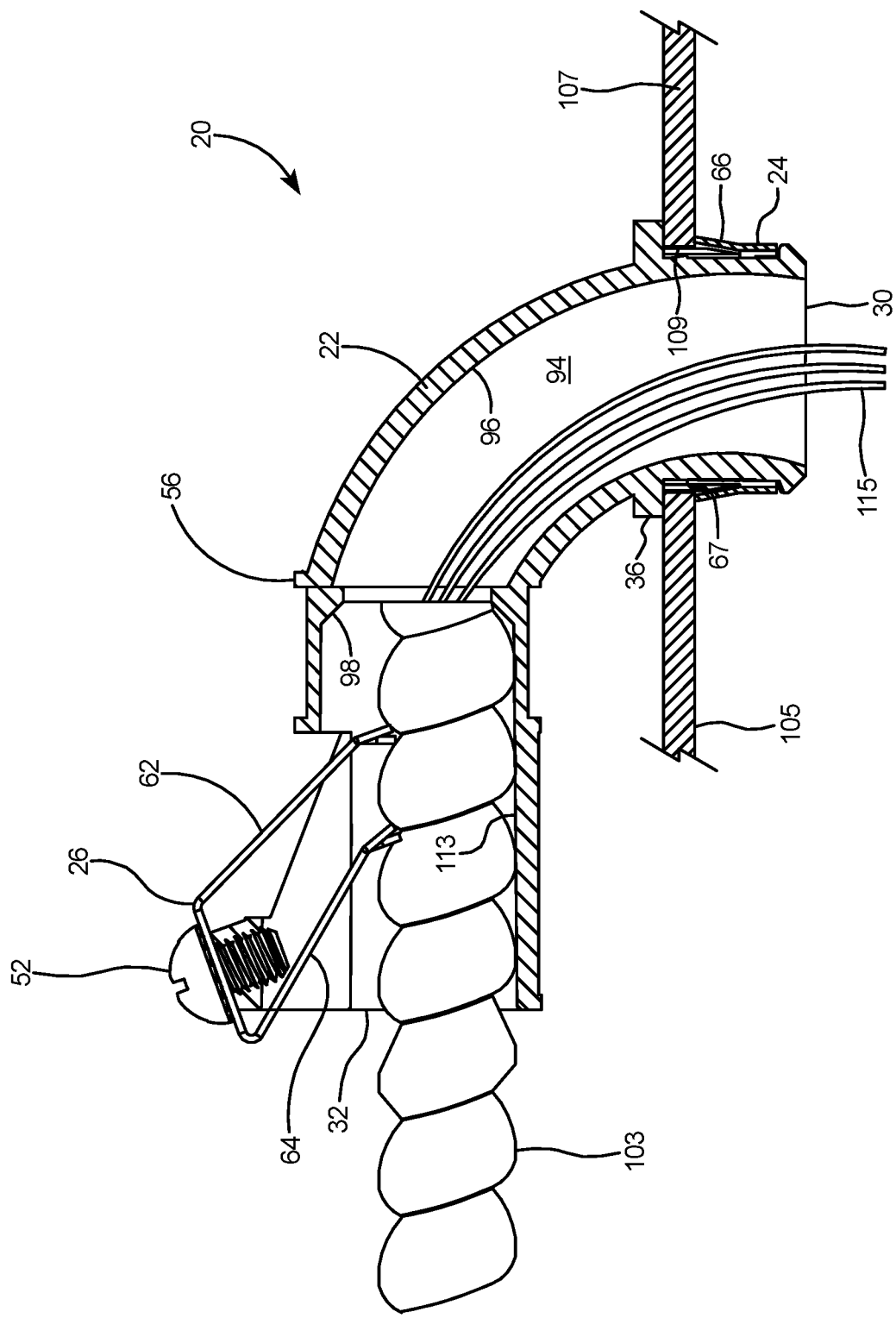
FIG. 11 is a sectional view of the ninety degree snap fit electrical fitting taken along line 7-7 of FIG. 3 and showing the leading end of the fitting secured to an electrical box and an electrical cable secured to the trailing end of the fitting.

As shown in FIG. 11, the ninety degree snap fit electrical fitting 20 of the present invention provides good electrical continuity between the outer sheath of the electrical cable 103, the electrical box 105 and the fitting 20 itself including the snap ring 24, the clip member 26, and the connector body 22. At the leading end 30 of the fitting 20, a grounding path is established between the electrical box 105 and the connector body 22 by the flush contact of the resilient locking tangs 66 with the wall 107 of the electrical box 105 and the contact of the resilient grounding tangs 67 with the inner periphery 109 of the walls forming the knockout. At the trailing end 32 of the fitting 20, a grounding path is established between the conductive sheath of the electrical cable 103 and the connector body 22 by the resilient legs 62 and 64 of clip member tightly grasping the electrical cable and the tight engagement of the electrical cable with the wall 113 of the connector body opposite the clip member 26. By virtue of the wide bend radius of the bore 94 within the connector body 22 and the smooth inner walls 96 of the connector body, wiring leads 115 of cable pass easily through the bore 94 of the connector body when inserted from the trailing end 32. Cable stop 98 acts to arrest the forward movement of the electrical cable 111 while allowing the wiring leads 115 to proceed there through to the leading end 30 of the connector body 22 and into the electrical box 105 where wire terminations may be completed. Thus electrical continuity is established and maintained between the electrical cable 103, the electrical box 105, and the ninety degree snap fit electrical fitting 20.

Referring to FIGS. 12-17, there is shown an alternate and preferred embodiment of a snap ring 121 according to the present invention. The snap ring 121 includes an arcuate or curved sidewall 123 as shown in FIG. 15. The snap ring 121 is preferably formed from a flat metal blank 125 as shown in FIG. 13. Locking tangs 66, slits 127 defining the grounding tangs 67, and an aperture 129 for purposes of locking the blank in a mandrel are formed in the blank 125. The flat metal blank 125 is then locked in a mandrel (not shown) and formed into the substantially tubular split ring shown in FIG. 14, after which the formed ring is annealed and hardened to retain its tubular shape and the arcuate sidewall 123. As shown in FIG. 16, the locking tang 66 extends outward of the arcuate sidewall 123 with its free end 84 directed toward the trailing end 82 of the snap ring 121. As shown in FIG. 17, grounding tangs 67 include extend a first straight portion 131 extending outward of the ring at a first angle from the arcuate sidewall 123 and then a second straight portion 133 extending outward of the ring at a second angle from the arcuate sidewall 123. Grounding tangs 67 terminate in a free end 135 that is substantially planar with the trailing end of the snap ring 121. Most preferably, the snap ring is formed of 0.020-inch 1050 grade spring steel, annealed and hardened to 42-44 Rc, and zinc-plated to a minimum thickness of 0.00015-inch.

What is at present considered the preferred embodiment of the present invention has been presented herein for purposes of illustration and description, but is not intended to be exhaustive or limited to the invention in the form disclosed. It will be obvious to those skilled in the art that various changes and modifications may be made therein without departing from the scope of the invention as defined by the appended claims.

What is claimed is:

1. A ninety degree snap fit electrical fitting comprising:
   a one-piece connector body including a wall having an outer bend, a leading end for connection to an electrical box, a trailing end for connection of an electrical cable having an outer sheath, and an internal surface of said wall defining an internal passageway having a 90 degree bend and a wide turn radius;
   a leading flange of said connector body at the leading end of said connector body;
   a box engagement flange of said connector body;
   a portion of said connector body between said leading flange and said box engagement flange defining a seat at said leading end of said connector body;
   a cable attachment section of said connector body on said trailing end of said connector body;
   a raised ramp of said connector body extending externally from said cable attachment section;
   a split snap ring disposed on said seat;
   a locking tang of said snap ring;
   a clip member secured to said raised ramp of said cable attachment section;
   a leading leg and a trailing leg of said clip member on the outer bend of said connector body, said leading leg and said trailing leg engaging the outer sheath of the electrical cable with the wall of the connector body opposite the outer bend to establish a grounding path between the outer sheath of the electrical cable and the connector body; and
   a trailing end flange of said connector body on said cable attachment section;
   a base portion of said connector body and two outward extending arms of said cable attachment section; and
   a bridge of said cable attachment section extending between said arms of said cable attachment section.

2. The ninety degree snap fit electrical fitting of claim 1, further comprising an opening between said arms and said trailing end flange.

* * * * *